(12) United States Patent
Satou et al.

(10) Patent No.: US 7,869,931 B2
(45) Date of Patent: Jan. 11, 2011

(54) ENGINE CONTROLLER

(75) Inventors: Shinya Satou, Hitachinaka (JP); Hitoshi Konno, Mito (JP); Mamoru Nemoto, Hitachiota (JP)

(73) Assignee: Hitachi, Ltd., Tokyo (JP)

( * ) Notice: Subject to any disclaimer, the term of this patent is extended or adjusted under 35 U.S.C. 154(b) by 929 days.

(21) Appl. No.: 11/740,599

(22) Filed: Apr. 26, 2007

(65) Prior Publication Data
US 2007/0254772 A1    Nov. 1, 2007

(30) Foreign Application Priority Data
Apr. 27, 2006    (JP)    ............................. 2006-123577

(51) Int. Cl.
*G06F 19/00*    (2006.01)
*G06G 7/70*    (2006.01)

(52) U.S. Cl. ..................... 701/111; 701/84; 701/85; 701/86; 701/101; 701/102; 701/103; 701/104; 701/105; 701/106; 701/107; 701/108; 701/109; 701/110; 701/113

(58) Field of Classification Search ................ None
See application file for complete search history.

(56) References Cited

FOREIGN PATENT DOCUMENTS

| JP | 58-152131 A | 9/1983 |
|----|-------------|--------|
| JP | 3-271537 A | 3/1991 |
| JP | 4-41948 A | 2/1992 |
| JP | 10-9018 A | 1/1998 |
| JP | 2001-355476 A | 12/2001 |

*Primary Examiner*—Khoi Tran
*Assistant Examiner*—Bhavesh V Amin
(74) *Attorney, Agent, or Firm*—Crowell & Moring LLP

(57) ABSTRACT

When an engine torque trace is set during acceleration or deceleration, the ratio of increase or decrease in the engine torque per unit time is restricted so that when the engine torque generated during acceleration or deceleration approaches an engine torque (balance torque) at which the engine is oriented upright with respect to the engine mount, the engine torque stays near the balance torque for a prescribed time.

8 Claims, 17 Drawing Sheets

| DIFFERENCE IN TORQUE [Nm] (HIGH-RESPONSE DEMANDED TORQUE - BALANCE TORQUE) | -40 | -20 | -5 | 0 | 5 | 20 | 40 |
|---|---|---|---|---|---|---|---|
| UPPER TORQUE INCREASE LIMIT [Nm] | LARGE | MEDIUM | SMALL | EX-TREMELY SMALL | SMALL | MEDIUM | LARGE |

EXAMPLE) CHANGE FROM DECELERATION TO ACCELERATION

ENGINE CONTROLLER

CLAIM OF PRIORITY

The present application claims priority from Japanese application serial no. 2006-123577, filed on Apr. 27, 2006, the content of which is hereby incorporated by reference into this application.

FIELD OF THE INVENTION

The present invention relates to an engine controller mounted on a vehicle.

BACKGROUND OF THE INVENTION

When, during the operation of an automobile, rapid acceleration or deceleration is caused by quickly operating the accelerator pedal, the engine torque sharply changes and the driving system including the drive shaft is twisted, which may generate back-and-forth vibration on the vehicle. This type of vehicle's back-and-forth vibration is called "jerking" and lowers drivability so it is a phenomenon that must be prevented. To essentially prevent the jerking, it suffices to set a small amount of change in the engine torque generated during acceleration and deceleration so as to control the twist of the driving system. When the amount of engine torque is just lessened, however, the accelerator response during acceleration or deceleration is lowered. Accordingly, a technology that satisfies both suppression of the vehicle's back-and-forth vibration and acceleration and deceleration response is desired.

Some technologies that satisfy the demands described above are disclosed. A first known technology is, for example, a technology described in Japanese Patent Laid-open No. Hei 3 (1991)-271537 (Patent Document 1). In Patent Document 1, a transmission function Gp(s) between an accelerator opening and a driving torque and another transmission function Gm(s) between a target acceleration opening and the driving torque are obtained and used to calculate a phase compensation value W(s) [=Gm(s)/Gp(s)]; W(s) is then used to control a throttle actuator (inverse filter control)

A second known technology is, for example, a technology described in Japanese Patent Laid-open No. 2001-355476 (Patent Document 2). In Patent Document 2, when there is drive train vibration, the drive torque is reduced until the vibration is eliminated, and the torque value generated during the vibration is recorded. When a torque generated during a next acceleration or later exceeds the recorded torque value, the increase in the torque is restricted.

SUMMARY OF THE INVENTION

The technology in Patent Document 1 uses a logical approach to suppress vehicle's back-and-forth vibration. In practice, however, it is difficult to identify a transmission function between the accelerator opening and the drive torque, so accurate inverse filter control is not necessarily performed.

The technology in Patent Document 2 performs control according to a learned value, so vehicle's back-and-forth vibration before learning, for example, immediately after the start of an operation, cannot be avoided. Another problem is that the engine torque value at which the vehicle's back-and-forth vibration occurs varies with the operation area and the states of the loads of auxiliary machines such as an air-conditioner, so the learned value cannot always be applied to the next acceleration.

The present invention addresses the above problems with the object of providing an engine torque control means that efficiently prevents the vehicle's back-and-forth vibration in all running states, without a tradeoff in the accelerator response.

A vehicle has a so-called spring-mass structure as shown in FIG. 19; the body and engine of the vehicle can be regarded as a mass and the driving system including the drive shaft can be regarded as a spring. If this type of structure undergoes a large amount of change in the axle driving force per unit time during acceleration or deceleration, force that causes vibration is generated, causing vehicle's back-and-forth vibration as shown in FIG. 20. To prevent the vehicle's back-and-forth vibration, therefore, it is necessary to prevent the amount of change in the torque applied to the driving system from becoming excessive during acceleration or deceleration by keeping the amount of change appropriate while the accelerator response is considered. The amount of change in the torque applied to the driving system is likely to become excessive when the wheel driving force is inverted between positive and negative levels, such as, from deceleration to acceleration and from acceleration to deceleration. When, for example, a front-engine front-drive drive vehicle changes from deceleration to acceleration, the engine shifts from a forward tilting state to a backward tilting state as shown in FIG. 21. The engine is finally fixed to the backward tilting state by the reaction force of the engine mount. The torque applied to the driving system during this period is almost 0 while the engine is swinging forward and backward, as shown in FIG. 22. At the moment when the engine is fixed to the backward tilting state, however, a rapid rise appears in the torque applied to the driving system due to a shock caused by the fixing of the engine. For a change from acceleration to deceleration as well, a rapid fall appears in the torque applied to the driving system though a similar process although the direction of the change is inverted.

To prevent the vehicle's back-and-forth vibration to address the phenomenon described above, it suffices to prevent a rapid rise and fall in the torque applied to the driving system by moderating the swinging of the engine during acceleration and deceleration, controlling the torque so as to reduce the shock applied when the engine is fixed, and maintaining, at appropriate levels, torque increase and decrease ratios immediately after the engine is fixed.

Accordingly, the engine controller of the present invention comprises a balance torque calculation means for obtaining a balance torque, which is an engine torque at which the engine stays upright during the running of the vehicle, and a running state determination means for determining a running state from an accelerator opening, a vehicle speed, the presence or absence of an externally demanded torque, and other factors; when the torque generated by the engine passes near the balance torque obtained by the balance torque calculation means during the acceleration or deceleration of the vehicle, the engine undergoes torque control according to a determination by the running state determination means so that the amount of change in the torque generated by the engine per unit time is restricted to or below a prescribed value.

In the present invention, the amount of change in the torque generated by the engine per unit time is determined according to a difference between the torque generated by the engine and the balance torque.

Specifically, as shown in FIG. 23, in the present invention, when the value of a generated engine torque approaches the engine torque value at which the engine stays upright with respect to the engine mount, that is, the balance torque value, in the middle of acceleration from the deceleration state, the engine torque change ratio is reduced to an extremely low value and the engine torque is slowly passed near the balance torque, after which the engine torque is increased again at an appropriate ratio (decreased when deceleration is in progress). When an engine torque track as described above is generated, a torque shock is reduced as shown in FIG. 24, which is applied to the driving system when the engine swings during acceleration or deceleration and then the engine position is fixed. Furthermore, since the torque increase or decrease ratio immediately after the engine position is fixed is made appropriate, the vehicle's back-and-forth vibration is prevented and a feeling of a suitable acceleration or deceleration is obtained.

Although the balance torque takes a different value depending on the operation area, the balance torque may be adapted to a practical test using a vehicle for each operation area or theoretical values may be calculated from motion equations for vehicles.

A preferable engine torque trace needed in the present invention takes a geometric form as shown in FIG. 24. This type of trace is hard to achieve in engine torque control based on only an electronically controlled throttle as in the conventional art. Accordingly, in the inventive engine torque control during acceleration or deceleration, high-speed, high-precision engine torque control is practiced using both an electronically controlled throttle and ignition retard. Specifically, as shown in FIG. 25, the electronically controlled throttle is opened widely so as to generate a slightly excessive engine torque with respect to a target torque to be achieved (acceleration high-response target torque). To eliminate a difference between the excessive engine torque and the target engine torque to be achieved, the generated engine torque value is controlled to the target engine torque by adjusting the engine torque so as to decrease it through the amount of ignition retard. The use of the torque control logic during acceleration or deceleration, as described above, sufficiently enables the geometric target engine torque trace to be achieved.

Although this torque control logic during acceleration or deceleration can also be implemented in conventional engine control, it should be practiced in torque-based (torque demand) engine control that has been recently put into practical use. The torque-based engine control is engine control in which a target engine torque is calculated from an accelerator opening and the revolutions of the engine, and throttle control, fuel control, ignition control, and the like are performed to obtain both a target engine torque and a target air-fuel ratio. In the conventional engine control, when the above torque control is performed with an aim to improve drivability, the amount of torque operation such as for the throttle opening and a timing of ignition needs to be adjusted directly and individually. In the torque-based engine control, a torque generation function that faithfully generates a target engine torque is inherently provided. To improve the drivability, it suffices to make a match mainly by use of a calculation means for calculating the target engine torque, relatively facilitating the matching work.

The balance torque calculation means in the present invention calculates the balance torque from a torque generated on the assumption that constant running is performed at the vehicle speed and gear position under the situation. The inventive balance torque calculation means accepts a vehicle speed, a gear position, and other factors and calculates the balance torque during acceleration or deceleration through a table search.

In the present invention, the amount of change in the torque generated by the engine per unit time is determined according to a time elapsed from the start of the acceleration or deceleration. Depending on the time elapsed from the start of the acceleration, an upper torque increase limit is set to a slightly large value at the initial period of the acceleration, set to a small value in a period in which the engine-generated torque approaches near the balance torque in the mid-term of the acceleration, and then set again to a large value in the last term of the acceleration.

In the present invention, the amount of change in the torque generated by the engine per unit time can be changed depending on whether a history before the acceleration is "fuel cutoff in progress". Since torque input supplied to the driving force varies depending on whether the history before acceleration is "fuel cutoff in progress" in the present invention, the upper limit of an increase in the torque can be changed depending on whether the history before acceleration is "fuel cutoff in progress".

In the present invention, the amount of change in the torque generated by the engine per unit time is 10 Nm/10 ms or less when the engine-generated torque passes near the balance torque. The vehicle's back-and-forth vibration is reliably prevented by restricting the amount of change in the torque generated by the engine per unit time to 10 Nm/10 ms or less when the engine-generated torque passes near the balance torque.

In the engine torque control in the present invention, the torque is controlled by using any one of torque control means for an electronically controlled throttle, a variable valve, an ignition timing, and the amount of fuel to be injected or using a combination of these means. In the engine control during acceleration and deceleration in the present invention, the torque is controlled by combining the electronically controlled throttle and the ignition timing (ignition retard). The ignition retard and the number of fuel cutoff cylinders may be combined for the control of the torque. When the torque is controlled by using a single means, a high-response target torque achieving means for the ignition timing, the amount of fuel to be injected, and the like is preferably used.

In the engine torque control in the present invention, to compensate the vehicle's back-and-forth vibration, a back-and-forth vibration suppression compensation means is provided that reduces a high-response target torque when the engine revolutions are raised rapidly and increases the high-response target torque when the engine revolutions drop rapidly. Even if the vehicle undergoes back-and-forth vibration for some reason, the back-and-forth vibration suppression compensation calculation means is initiated and the vehicle's back-and-forth vibration can thereby be reduced.

The engine controller in the present invention has a torque determination means for determining a torque generated by the engine in a constant running state before acceleration or deceleration of the vehicle when the vehicle is accelerated or decelerated, and includes an acceleration/deceleration state determination means for detecting or estimating the acceleration/deceleration state; the torque generated by the engine is controlled so as to be maintained for a prescribed time at the torque in the constant running state, which is determined by the torque determination means, according to the acceleration/deceleration state of the vehicle, which is detected or estimated by the acceleration/deceleration state determination means. When the vehicle is in the constant running state in which the vehicle is neither accelerated nor decelerated, the engine stays approximately upright. Accordingly, the torque generated by the engine in the constant running state before acceleration or deceleration is determined by the torque determination means; when the acceleration/deceleration state determination means detects or estimates the acceleration/ deceleration state in which the vehicle is decelerated from the constant running state and then accelerated or the vehicle is accelerated from the constant running state and then decelerated, the engine-generated torque is controlled so as to be maintained for a preset time at the torque in the constant running state when the engine-generated torque approaches the torque in the constant running state, which is calculated by the torque determination means, after which the engine-generated torque is controlled so that the acceleration/deceleration state is brought again. Accordingly, the shock caused when the engine is placed in the fixed state is reduced, preventing the vehicle's back-and-forth vibration and giving a preferable feeling of acceleration and deceleration.

According to the present invention, when the engine-generated torque passes near the balance torque during the rapid acceleration or deceleration of the automobile, the engine undergoes torque control so that the amount of change in the engine-generated torque per unit time is controlled to or below a prescribed value. Vehicle's back-and-forth vibration caused by a twist of the driving system is thereby prevented, enabling the drivability to be improved.

DESCRIPTION OF THE PREFERRED EMBODIMENTS

Figure 1:
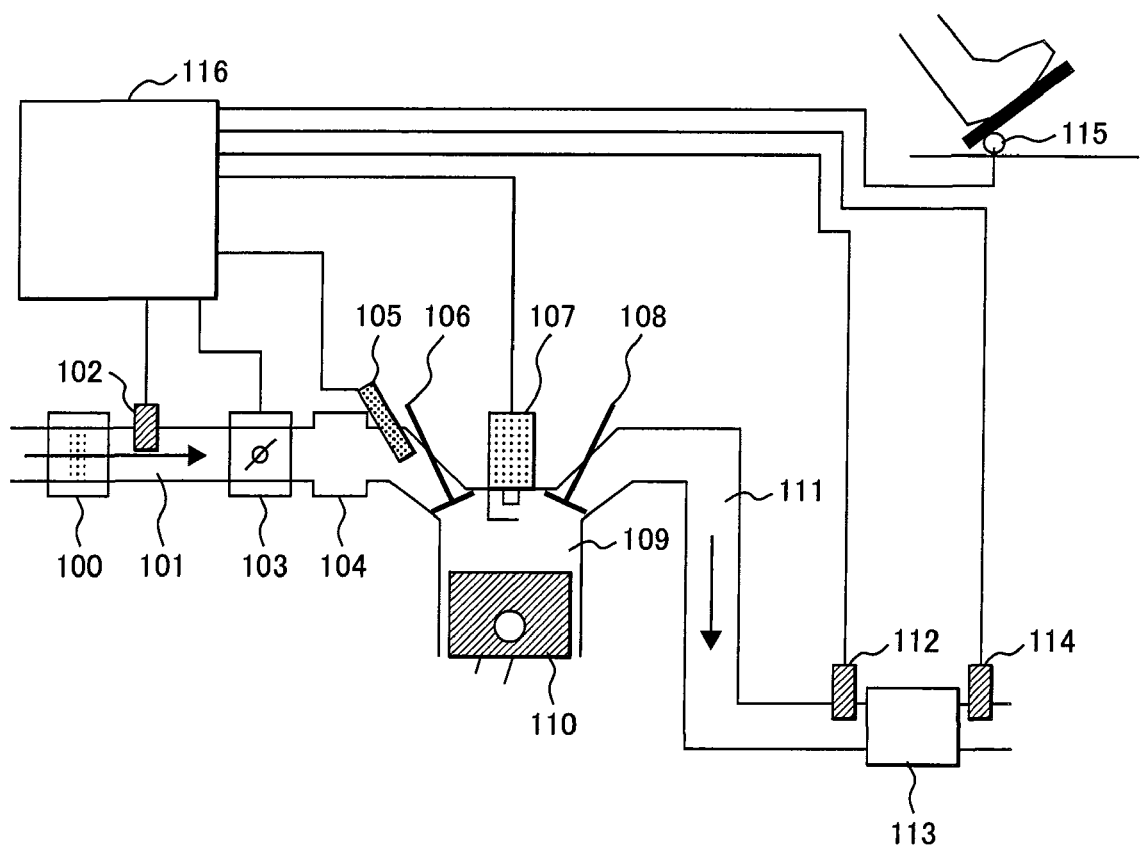
FIG. 1 shows the hardware structure of a torque-based engine control system.
Figure 2:
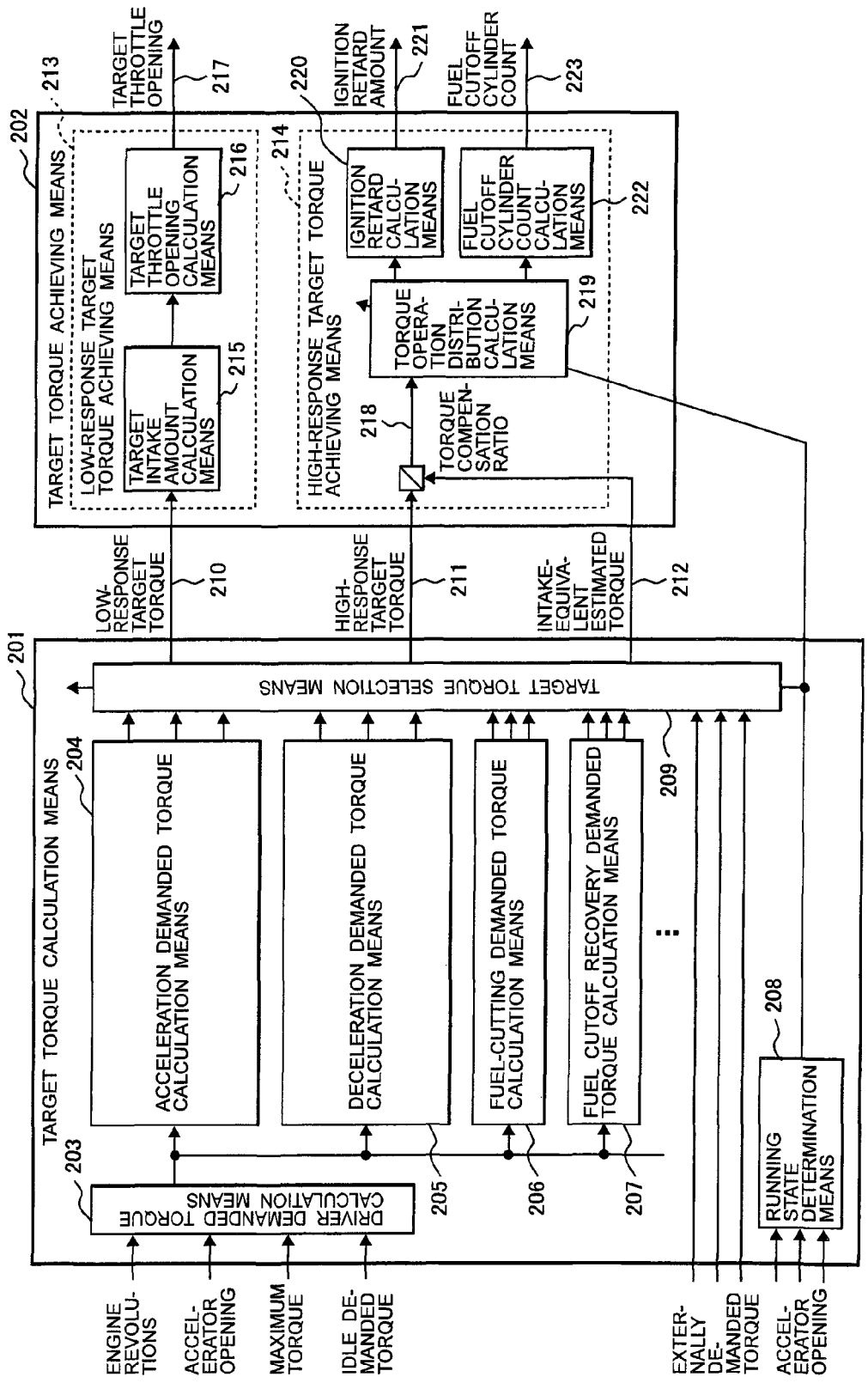
FIG. 2 is an entire control block diagram for the torque-based engine control in a first embodiment.

Embodiments of the present invention will be described below in detail. FIG. 1 shows the hardware structure of a torque-based engine control system capable of homogeneous stoichiometric combustion, which is a first embodiment according to the present invention, the system being operated near a theoretical air-fuel ratio. FIG. 2 is a control block diagram for torque-based engine control implemented by this hardware configuration.

First, the hardware configuration will be described with reference to FIG. 1. Air inhaled from the inlet of an intake tube 101 passes through an air cleaner 100. After the amount of inhaled air is measured by an air flow sensor 102 disposed in the middle of the intake tube 101, the inhaled air is delivered to the inlet of an electronically controlled throttle valve 103 that adjusts the amount of inhaled air. A value measured by an air flow sensor 102 is sent to an engine control unit (ECU) 116, according to which the width of a fuel injection pulse from an injector 105 is calculated so that the air-fuel ratio becomes theoretical. The inhaled air that has passed through the electronically controlled throttle valve 103 passes through a collector 104 and is then delivered to the interior of an intake manifold, after which the inhaled air is mixed with gasoline mist sprayed from the injector 105 according to a signal for the fuel injection pulse width, producing an air-fuel mixture. The air-fuel mixture is delivered to the interior of a cylinder 109 in synchronization with the opening and closing of an intake valve 106. The intake valve 106 is then closed, and the mixture, which has been compressed in the course of a piston 110 being raised, is ignited by an ignition plug 107 immediately before the top dead center, according to an ignition timing commanded by the ECU. Since the mixture rapidly expands, the piston 110 is pressed down, generating an engine torque. The piston 110 is then raised. An exhaust process starts at the moment when an exhaust valve 108 opens, and the exhaust gas is delivered to an exhaust manifold 111. A three-way catalyst 113 for purifying the exhaust is provided downstream of the exhaust manifold 111; when the exhaust gas passes through the three-way catalyst 113, exhaust components HC, CO, and NOx are converted into $H_2O$ $CO_2$, and $N_2$. A wide air-fuel ratio sensor 112 is provided at the three-way catalyst inlet, and an $O_2$ sensor 114 is provided at the three-way catalyst outlet. Air-fuel ratio information measured by these sensors is sent to the ECU 116. The ECU 116 performs air-fuel ratio feedback control by adjustment of the amount of fuel to be injected according to the information so that the air-fuel ratio approximately becomes the theoretical air-fuel ratio. The command value for the opening of the electronically controlled throttle valve is set according to a target engine torque, which will be described below, calculated in the ECU. The fuel injection pulse width is may be set to 0 (fuel is cut) responsive to the target engine torque, depending on the cylinder number. Although the ignition timing is usually set to an MBT (ignition timing at which a maximum engine torque is generated), it may also be set to a long value (ignition is retarded), depending on the target engine torque.

Next, all control blocks for torque-based engine control in the hardware configuration will be described with reference to FIG. 2. The main components in this engine control are a target torque calculation means 201 and a target torque achieving means 202. The target torque calculation means 201 includes a running state determination means 208 and a driver demanded torque calculation means 203, responsive to the driver's operation of the accelerator, for calculating the most basic demanded torque. The driver demanded torque calculation means 203 calculates the engine torque demanded by the driver from the accelerator opening, the engine revolutions, the maximum torque, and an idle demanded torque. The running state determination means 208 determines a running state in the situation from the accelerator opening, the vehicle speed, and the presence or absence of an externally demanded torque. Demanded torque calculation means for improving the operability during transition are provided behind the driver demanded torque calculation means 203; they include an acceleration demanded torque calculation means 204 for calculating a torque demanded for acceleration, a deceleration demanded torque calculation means 205 for calculating a torque demanded for deceleration, a fuel-cutting demanded torque calculation means 206 for calculating a torque demanded for cutting off fuel, and a fuel cutoff recovery demanded torque calculation means 207 for calculating a torque demanded for recovering the fuel cutoff. A target torque selection means 209 is further provided behind these demanded torque calculation means; it selects a demanded torque optimum for the vehicle from the demanded torques and externally demanded torques for traction control and closed control, according to the determination result of the running state determination means 208, and outputs an intake-equivalent estimated torque 212, which is an engine torque estimated on the assumption that only two target engine torques (low-response target torque 210 and high-response target torque 211) and intake control are applied.

The target torque achieving means 202 includes a low-response target torque achieving means 213 necessary for achieving low-speed torque control by the electronically controlled throttle and a high-response target torque achieving means 214 necessary for achieving high-speed torque control by ignition retard or fuel cutoff. In the low-response target torque achieving means 213, a target intake amount calculation means 215 is provided; it calculates a target intake amount necessary for achieving the low-response target torque 210. A target throttle opening calculation means 216 for achieving the target intake amount is provided behind the target intake amount calculation means 215; it calculates a desired target throttle opening 217 and sends it to the electronically controlled throttle.

In the high-response target torque achieving means 214, a torque compensation ratio 218 is obtained by dividing high-response target torque 211 by the intake-equivalent estimated torque 212, and a torque operation distribution calculation means 219 calculates a desired torque operation ratio from the torque compensation ratio 218. The torque operation ratio, which should be used as the target, is then sent to an ignition retard calculation means 220 and a fuel cutoff cylinder count calculation means 222. The ignition retard calculation means 220 calculates an ignition retard amount 221 according to a share for ignition of the sent torque operation ratio, and sends the calculated result to an ignition timing control calculation means. The fuel cutoff cylinder count calculation means 222 also calculates a fuel cutoff cylinder count 223 according to a share for fuel of the sent torque operation ratio, and sends the calculation result to a fuel injection control calculation means. The ratio of the shares for ignition and fuel torque of the torque operation ratio is determined according to the determination result of the running state determination means 208.

Figure 3:
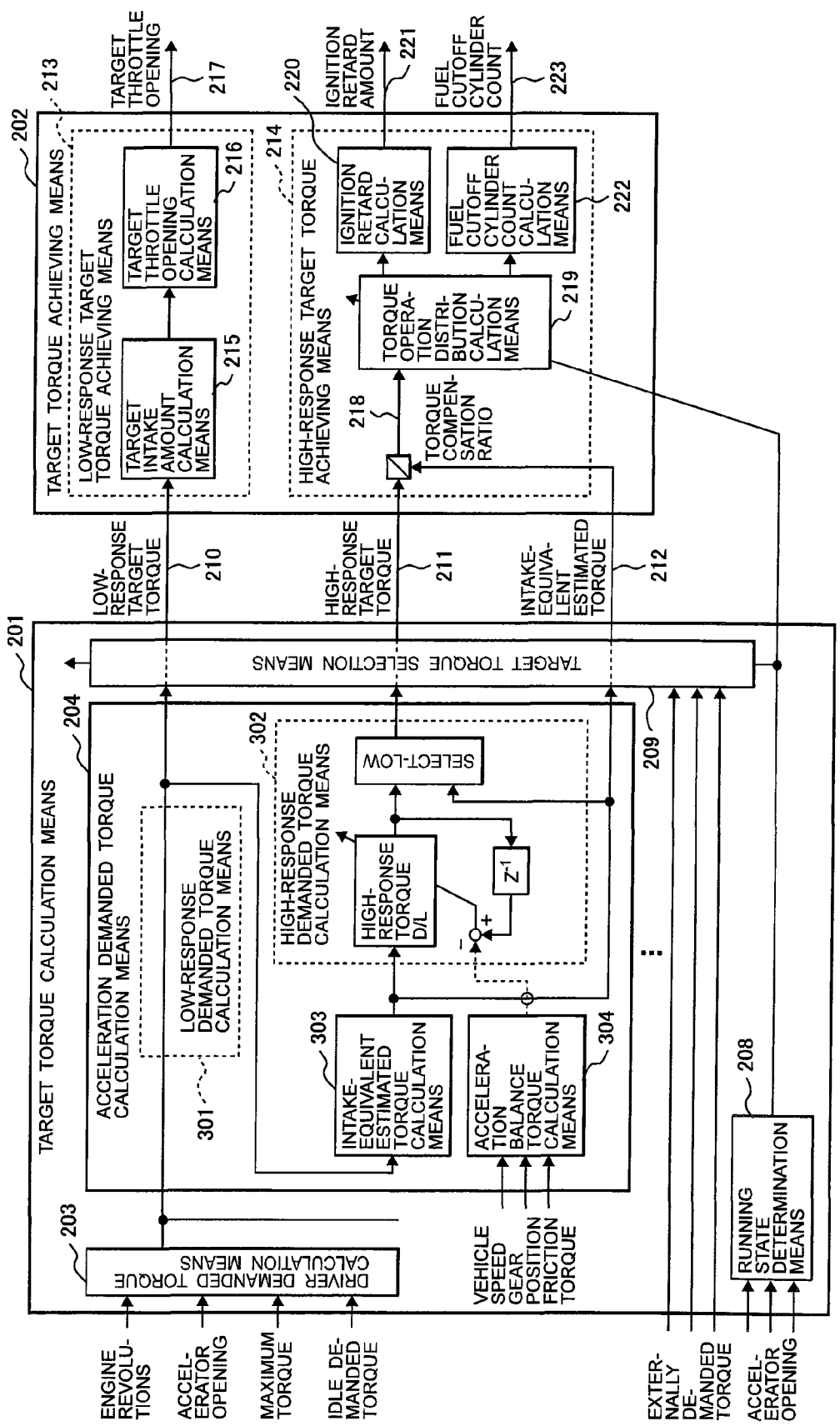
FIG. 3 shows calculations in the acceleration demanded torque calculation means 204 in the first embodiment.
Figures 4, 5:
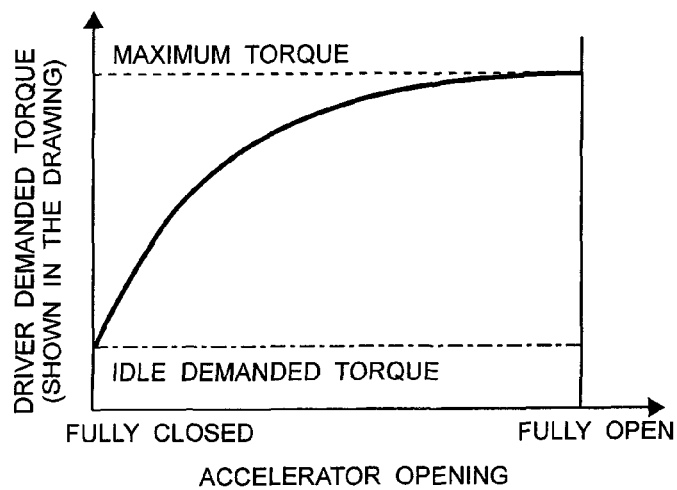
FIG. 4 shows the relation between the accelerator opening and the driver demanded torque.
FIG. 5 shows the contents of an upper torque increase limit table used in dynamic limit processing during high-response target torque calculation in the first embodiment.

The first embodiment of the present invention will be described next, with reference to FIGS. 3 to 7. FIG. 3 shows parameter calculations in the acceleration demanded torque calculation means 204 in detail, which are performed when acceleration is determined by the running state determination means 208 and the acceleration demanded torque calculation means 204 is selected. As described above, the driver demanded torque calculation means 203, from which an acceleration demanded torque calculation starts, calculates a demanded torque responsive to the accelerator operation by the driver, according to a maximum torque and idle demanded torque at time-varying engine revolutions. Specifically, as shown in FIG. 4, a calculation of a demanded torque is performed so as to achieve a torque characteristic almost equivalent to that in a system using a mechanical throttle and an idle speed control (ISC) valve. That is, when the accelerator is fully closed, an idle demanded torque is calculated, and the demanded torque is gradually increased so that a convex is formed upward as the accelerator opening increases. When the accelerator is fully opened finally, a maximum torque at the engine revolutions at that time is calculated.

The acceleration demanded torque calculation means 204 calculates an acceleration low-response demanded torque, acceleration high-response demanded torque, and intake-equivalent estimated torque from the driver demanded torque and the balance torque described next. The balance torque is an engine torque necessary for keeping the engine upright with respect to the engine mount. An acceleration balance torque calculation means 304 accepts a vehicle speed, gear position, and friction torque and calculates the acceleration balance torque through a table search. As a balance torque matching method, since the engine stays approximately upright with respect to the engine mount during R or L constant running, it suffices to measure an engine torque during the R or L running in each engine operation area determined by the vehicle speed and gear position and to add a compensation based on the engine torque during the constant running so as to obtain a desired operability during acceleration or deceleration.

In the acceleration low-response demanded torque calculation necessary for low-response torque control such as control for the electronically controlled throttle, the driver target torque is output as an acceleration low-response demanded torque without alternation in an acceleration low-response demanded torque calculation means 301, and the output is used in control for the electronically controlled throttle.

Next, calculation of the intake-equivalent estimated torque and acceleration high-response demanded torque necessary for high-response torque control such as ignition retard and fuel cutoff will be described. In view of the operational delay of the electronically controlled throttle valve and a delay in the charging or discharging of the intake due to an intake tube volume, the intake-equivalent estimated torque is calculated in the intake-equivalent estimated torque calculation means 303 by performing delay processing on the acceleration low-response demanded torque. Processing for a waste time and a primary delay based on data obtained from an actual vehicle is performed as a concrete delay processing method in this embodiment, but physical models of the electronically controlled throttle valve and intake tube may be structured to calculate a theoretical delay by use of these physical models.

An acceleration high-response demanded torque calculation means 302 performs dynamic limit processing on the intake-equivalent estimated torque, which is a basis of the acceleration high-response demanded torque, to calculate the acceleration high-response demanded torque. In the dynamic limit processing, an upper limit is set for the amount of torque increase per unit time, and the increase in the torque per unit time in the acceleration high-response demanded torque is controlled so that it does not exceed the upper limit. Specifically, the following calculations are performed.

(1) A difference in the torque between a basic acceleration high-response demanded torque value [previous value] and the balance torque is obtained, and an upper torque increase limit corresponding to the difference in the torque is obtained from an upper torque increase limit table as shown in FIG. 5.

(2) An increase in the torque (=intake-equivalent estimated torque−basic acceleration high-response demanded torque value [previous value]) is obtained and the following calculation is performed.

a) When "increase in the torque"≦"upper torque increase limit"

Basic acceleration high-response demanded torque value=intake-equivalent estimated torque (current value)

b) When "increase in the torque">"upper torque increase limit"

Basic acceleration high-response demanded torque value=basic acceleration high-response demanded torque value [previous value]+upper torque increase limit (3) Finally, select-low processing is performed on the basic acceleration high-response demanded torque value and the intake-equivalent estimated torque (current value) to calculate a final acceleration high-response demanded torque.

The torque input given to the driving force varies depending on whether the history before acceleration is "fuel cutoff in progress", so the upper torque increase limit is preferably switched depending on whether the history before acceleration is "fuel cutoff in progress". Although the upper torque increase limit near the balance torque varies with the vehicle model, it is approximately 10 Nm/10 ms.

Next, how the parameters related to the acceleration demanded torque, which is calculated according to the calculation described above, change during acceleration will be described with reference to FIG. 6. Acceleration starts when the driver operates the accelerator. As the accelerator opening increases, the driver demanded torque and the low-response target torque increase and the throttle opening of the electronically controlled throttle valve also increases in response to their increase. As the throttle opening increases, the amount of air to be inhaled increases and, as shown in FIG. 6, a rise appears in the intake-equivalent engine torque.

The high-response target torque is separately calculated in parallel to the above so that both the prevention of the vehicle's back-and-forth vibration and preferable accelerator response are satisfied during acceleration. Specifically, the dynamic limit processing is performed on the intake-equivalent estimated torque so as to control the increase in the torque per unit time successively according to the acceleration phase and produce a high-response target torque trace as shown in FIG. 6. That is, the high-response target torque gradually increases at the initial period of the acceleration; when the high-response target torque approaches the balance torque under this situation in the middle of acceleration, the upper torque increase limit is set to an extremely small value by the calculation processing and the increase ratio of the high-response target torque is lowered. After the high-response target torque then slowly passes near the balance torque, the upper torque increase limit is alleviated again, and the high-response target torque has an appropriate torque increase ratio and finally reaches the driver demanded torque value.

Figure 6:
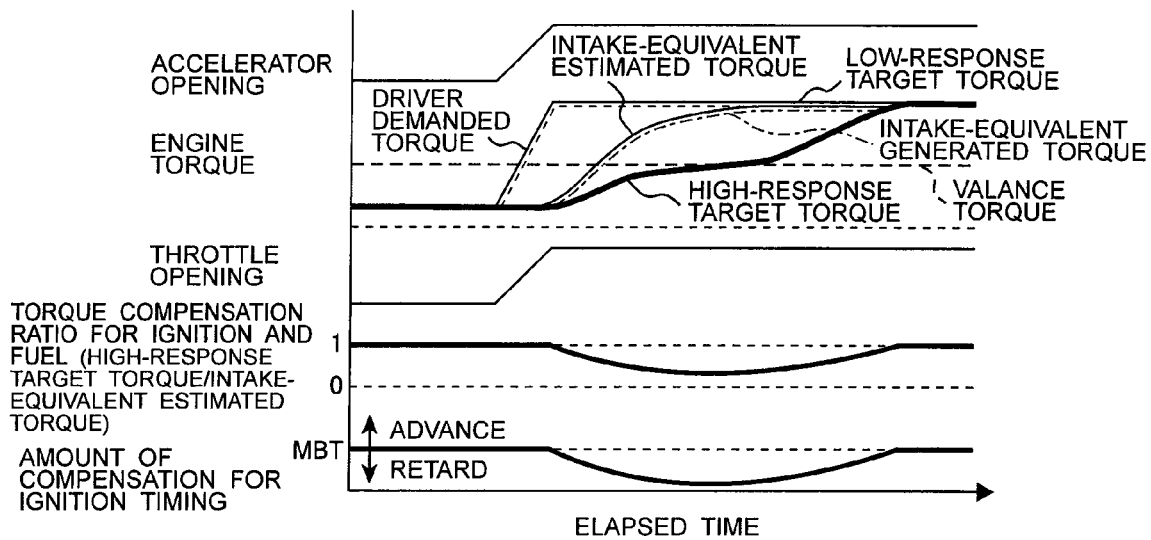
FIG. 6 illustrates how calculation parameters in the first embodiment change during acceleration.
Figure 7:
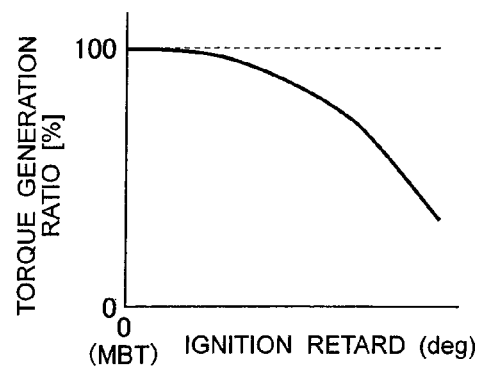
FIG. 7 shows the relation between the ignition retard amount and the torque generation ratio.

As shown in FIG. 6, the high-response target torque often draws a geometrical target torque trace, so it is hard to obtain the geometrical target torque trace in torque control only by the electronically controlled throttle valve. Accordingly, the intake-equivalent engine torque, which can be predicted to be attainable in torque control only by the electronically controlled throttle valve, is estimated by the intake-equivalent estimated torque calculation means 303; if there is a difference between the estimated torque and the high-response target torque, a high-response torque operation (high-speed torque operation by retarding ignition when acceleration is in progress) is performed so that the difference is eliminated. Specifically, the torque compensation ratio 218 is calculated as an index for obtaining the difference (ratio) between the high-response target torque and the intake-equivalent estimated torque, as shown below.

Torque compensation ratio=high-response target torque÷intake-equivalent estimated torque The torque compensation ratio takes a value from 0 to 1. When the torque compensation ratio is 1, the high-response target torque operation does not need to be performed. When the torque compensation ratio is, for example, 0.7, it means that the torque is reduced by 30% by the high-response target torque operation. The torque operation distribution calculation means 219 accepts the compensation ratio and considers a torque compensation ratio shared between the torque compensation by an ignition timing and the torque compensation by fuel cutoff, so the torque compensation ratio 218 is sent to the torque operation distribution calculation means 219. The torque operation by fuel cutoff is not performed during acceleration, in which case the torque compensation ratio 218 is sent to an ignition retard calculation means 220 without alteration. The ignition retard calculation means 220 then calculates the ignition retard 221 with which a desired torque compensation can be performed, according to, for example, the relation shown in FIG. 7.

The target torque calculation means and the target torque achieving means as described above control the torque so that the engine vibration during acceleration is alleviated and the shock at the time of fixing the engine is reduced, and also set the torque increase ratio immediately after the engine is fixed to an appropriate value to prevent a rapid rise from occurring in the torque applied to the driving system. As a result, both the prevention of the vehicle's back-and-forth vibration and preferable accelerator response can be achieved during acceleration. A combination of the electronically controlled throttle valve and ignition retard is used in this embodiment, but the embodiment is not limited to this combination; various types of variable valves may be used. If an exhaust purifying system that accepts not only stoichiometric combustion but also a wide range of air-fuel ratios is provided, the torque may be controlled by increasing and decreasing the amount of fuel to be injected.

In the first embodiment, the acceleration low-response demanded torque and the driver demanded torque are applied without alteration, so the difference between the high-response target torque and the intake-equivalent estimated torque becomes large, which is likely to cause the ignition retard amount 221 used for torque correction to become large. A too large value of the ignition retard amount 221 results in poor fuel economy and unstable combustion such as the inability to ignite, so the ignition retard amount 221 needs to be set to a value as small as possible. If both ignition retard and fuel cutoff are used for torque correction during acceleration, it is theoretically possible to decrease the ignition retard amount 221. When the torque is corrected by cutting off fuel during acceleration, however, a torque shock occurs and exhaust is worsened, so torque correction by both the ignition retard and fuel cutoff is not practical. To essentially address this problem, a device for lessening the difference between the high-response target torque and the intake-equivalent estimated torque is required.

Figure 8:
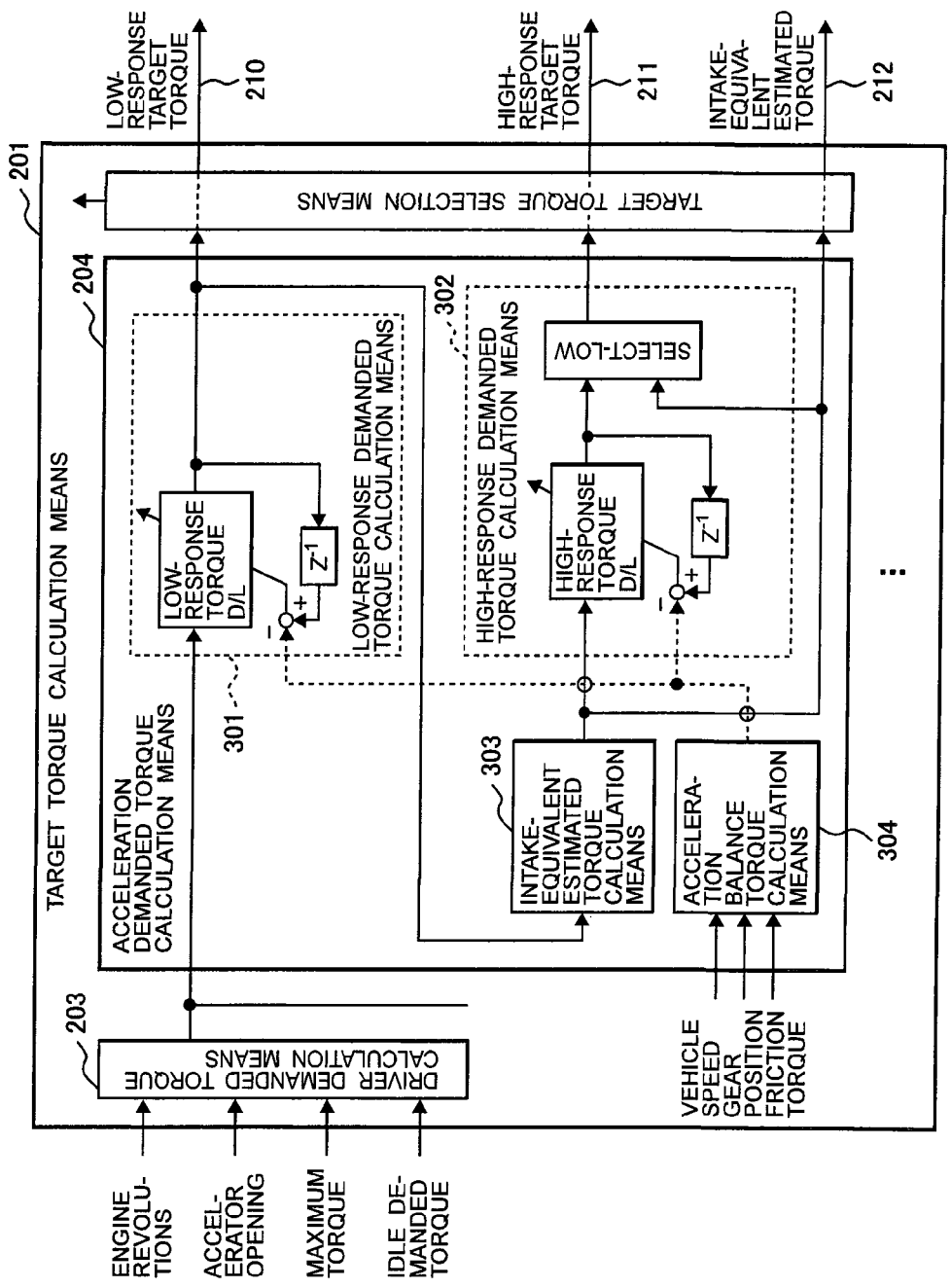
FIG. 8 shows calculations in the acceleration demanded torque calculation means 204 in a second embodiment.
Figure 9:
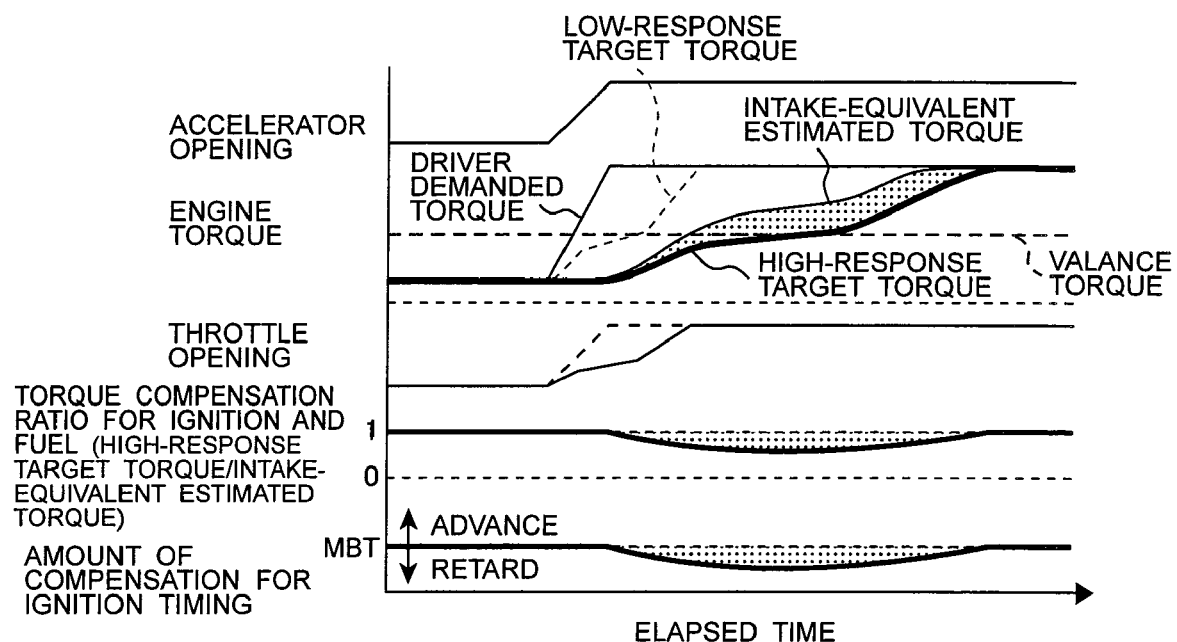
FIG. 9 illustrates how calculation parameters in the second embodiment change during acceleration.

In a second embodiment, the dynamic processing is performed in the acceleration low-response demanded torque calculation as well as in the high-response target torque calculation, and excessive ignition retard is not performed. FIG. 8 shows the acceleration demanded torque calculation means 204 in the second embodiment in detail. Unlike the first embodiment, the acceleration low-response demanded torque calculation means 301 in the acceleration demanded torque calculation means 204 performs the dynamic limit processing on the driver demanded torque with the torque trace near the balance torque taken into consideration, so as to yield an acceleration low-response demanded torque. This dynamic limit processing makes the torque trace of the acceleration low-response demanded torque approach the high-response target torque trace, as shown in FIG. 9. In response to this, the traces of not only the intake-equivalent generated torque but also the intake-equivalent estimated torque, which is an estimated value thereof, approach the high-response target torque. The ignition retard amount 221, which is the amount of operation required for torque correction, can thereby be minimized.

Figure 10:
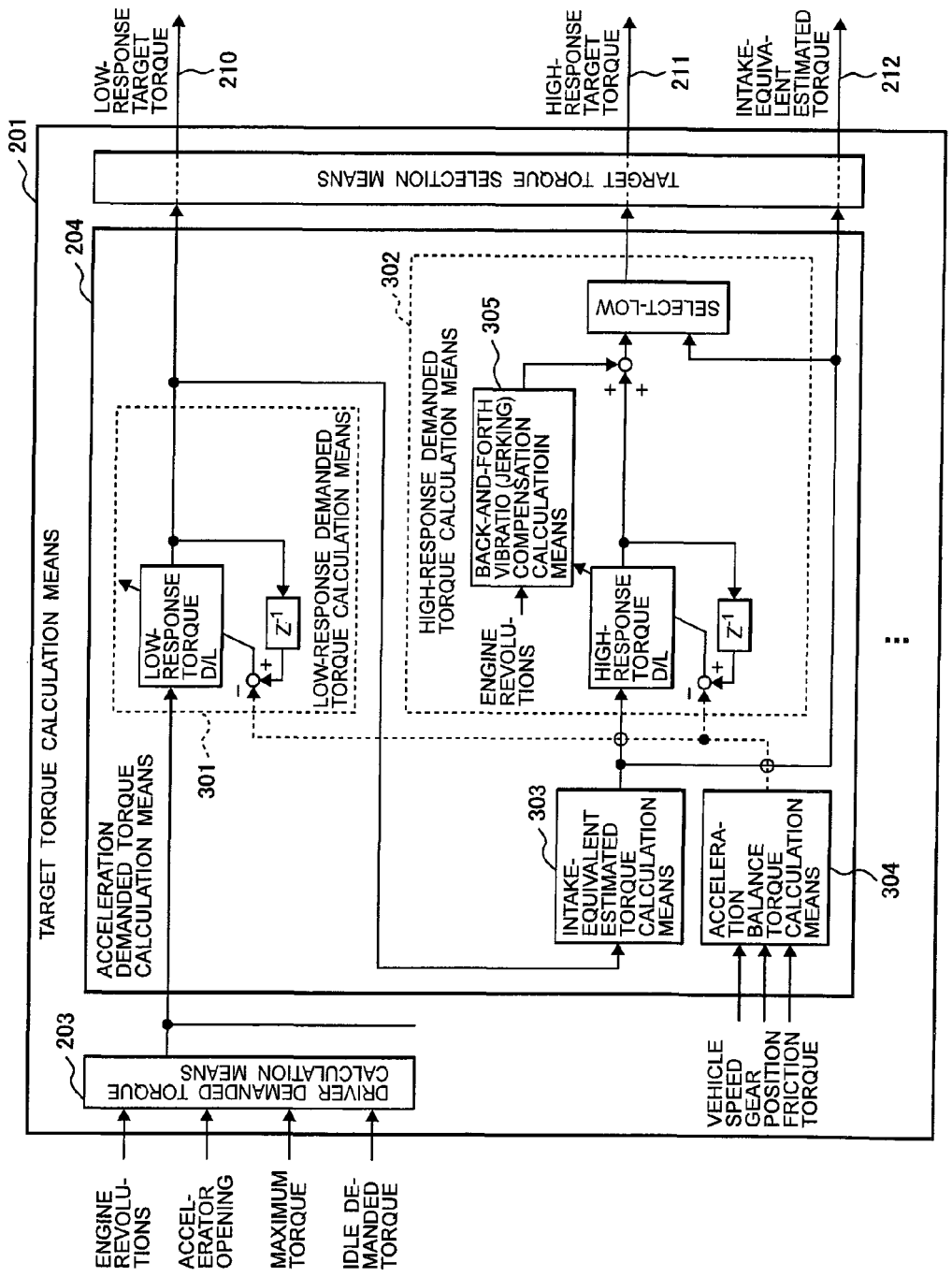
FIG. 10 shows calculations in the acceleration demanded torque calculation means 204 in a third embodiment.
Figure 11:
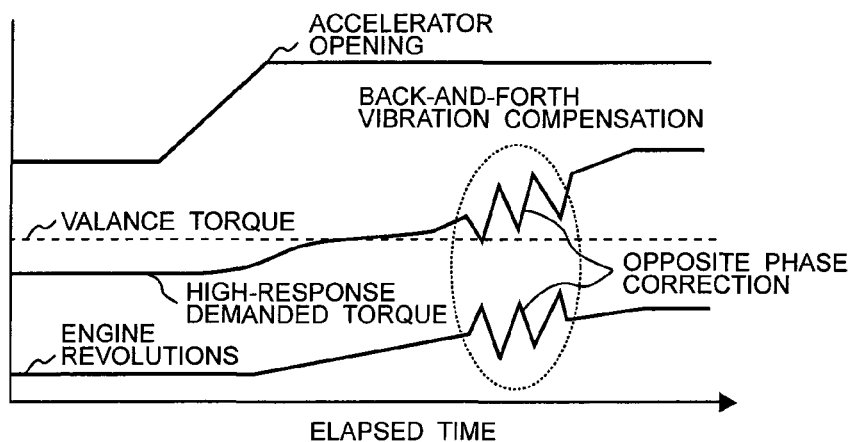
FIG. 11 illustrates vehicle's back-and-forth vibration correction in the third embodiment.
Figure 12:
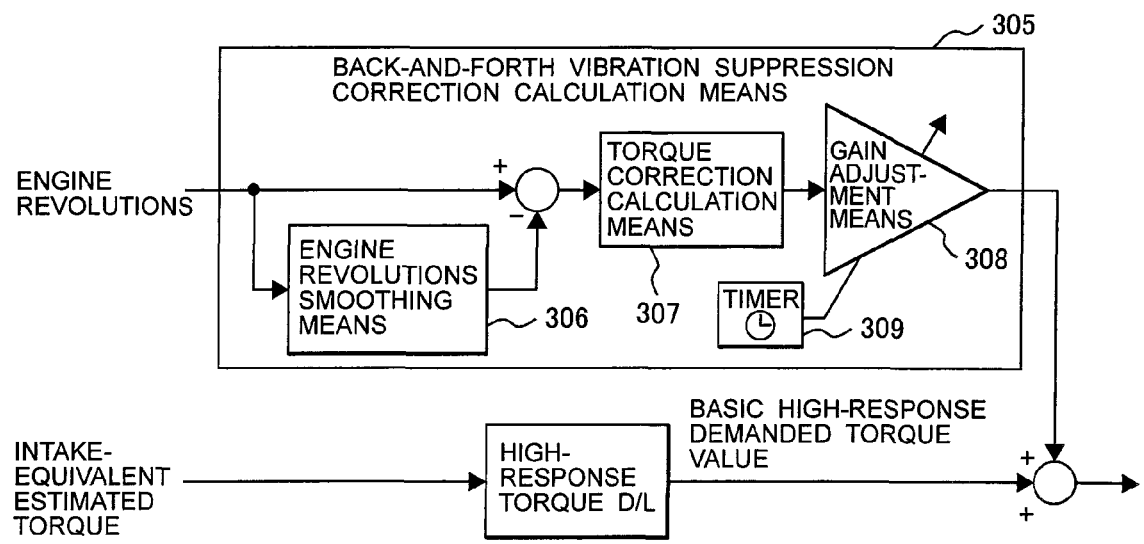
FIG. 12 shows a calculation in the back-and-forth vibration suppression compensation calculation means 305 in the third embodiment.
Figure 13:
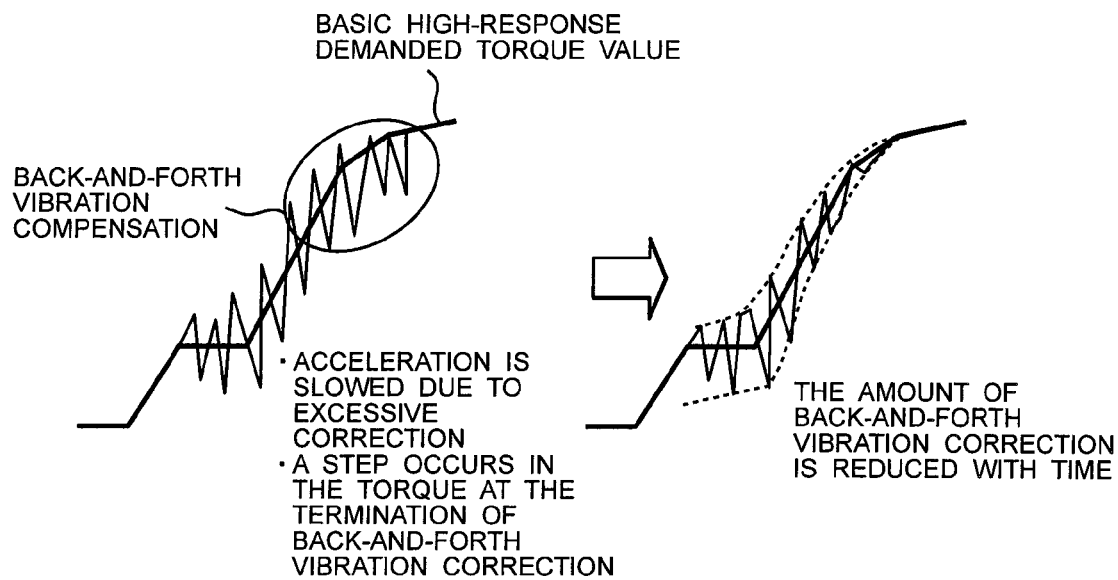
FIG. 13 illustrates a detailed calculation for the vehicle's back-and-forth vibration compensation in the third embodiment.

The vehicle's back-and-forth vibration can be suppressed in almost all situations by the torque control logic executed during acceleration described above, which is an occurrence suppressing measure to prevent the back-and-forth vibration of an engine-mounted vehicle. However, control of the axle becomes inappropriate due to a mismatch with the balance torque and vehicle deterioration caused with time; in some cases, vehicle's back-and-forth vibration may be generated during acceleration. Accordingly, in a third embodiment, vehicle's back-and-forth vibration compensation is added as a corrective remedy in case that vehicle's back-and-forth vibration is unexpectedly generated, besides the above occurrence suppressing measure against the jerking. FIG. 10 shows the acceleration demanded torque calculation means 204 in the third embodiment in detail. The acceleration high-response demanded torque calculation means 302 in the acceleration demanded torque calculation means 204 performs a jerking correction by adding a back-and-forth vibration suppression (jerking) compensation calculation means after the dynamic limit processing. In the jerking correction, a sudden change in engine revolutions, which is caused by vehicle's back-and-forth vibration, is detected. As illustrated in FIG. 11, when the engine revolutions are rapidly increased, the high-response target torque is decreased; when the engine revolutions are rapidly decreased, the high-response target torque is increased. The back-and-forth vibration is thereby eliminated. FIG. 12 shows the back-and-forth vibration suppression (jerking) compensation calculation means in detail. An engine revolutions smoothing means 306 provided in the back-and-forth vibration suppression (jerking) compensation calculation means 305 uses a primary-delay filter or the like to smooth the engine revolutions, and calculates an engine revolutions according to which whether there is vehicle's back-and-forth vibration is determined. Next, a torque correction calculation means 307 for performing the jerking correction will be described. The torque correction calculation means 307 calculates a difference between the smoothed engine revolutions and the actual engine revolutions; when the difference is large, the torque correction calculation means 307 calculates the amount of torque correction by which the vehicle's back-and-forth vibration is eliminated, according to the above logic. In this embodiment, the amount of torque correction found to be suitable in a practical test using an actual vehicle is obtained through a table search. However, a theoretical amount of torque correction may be obtained from a physical model of a vehicle. If, as shown in FIG. 13, the jerking correction is continued even in the final period during which the vehicle vibration converges, excessive correction may lessen a feeling of acceleration. The driver may also get a feeling of strangeness because of a torque difference that is caused when the vehicle's back-and-forth vibration compensation stops at the time of the termination of the acceleration determination. Accordingly, a gain adjustment timer 309 and a gain adjustment means 308 are provided in the back-and-forth vibration suppression (jerking) compensation calculation means 305; the gain adjustment means 308 controls the gain so that the amount of torque correction is reduced as time elapses from the start of the acceleration, and reaches 0 when the acceleration is terminated.

Figure 14:
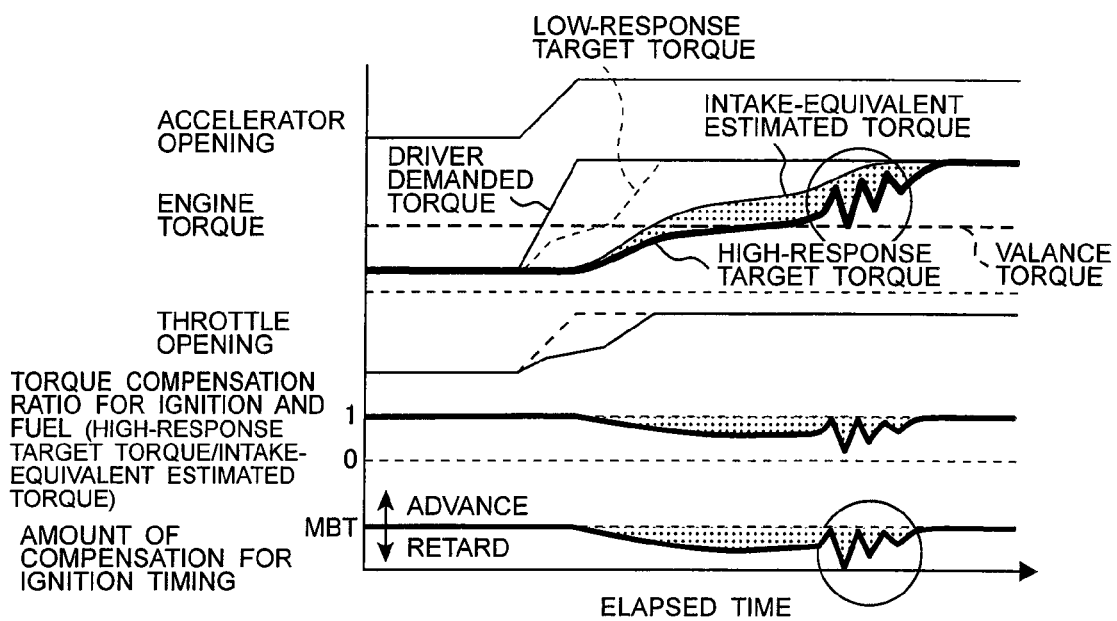
FIG. 14 illustrates how calculation parameters in the third embodiment change during acceleration.

Next, how the parameters related to the acceleration demanded torque change during acceleration will be described with reference to FIG. 14. In a first half of the acceleration, the parameters change as in the second embodiment. When vehicle's back-and-forth vibration is generated due to a mismatch with the balance torque or another factor in a latter half of the acceleration, a jerking correction is performed. In the jerking correction, the high-response target torque changes at short intervals so as to eliminate the vehicle's back-and-forth vibration, and the torque is corrected at high speed by retarding ignition so as to achieve the high-response target torque. As described above, in this embodiment, not only the calculation of the basic trace of the high-response target torque with the balance torque taken into consideration as an occurrence suppressing measure is performed, but also, even if vehicle's back-and-forth vibration is generated for some reason, the jerking correction, which is a corrective remedy, is initiated to reduce the vehicle's back-and-forth vibration. As a result, the vehicle's back-and-forth vibration can be efficiently suppressed in any case.

Figure 15:
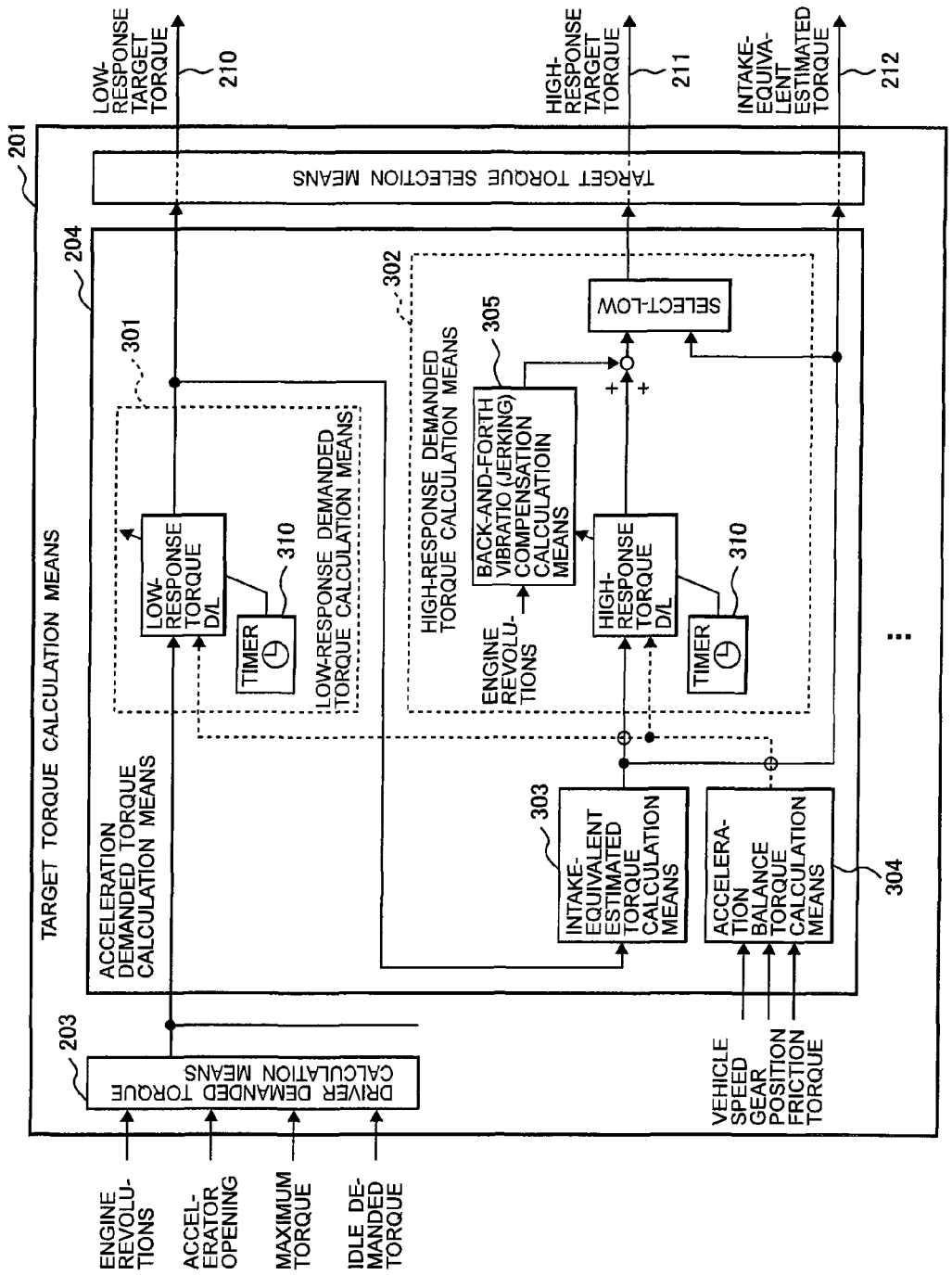
FIG. 15 shows calculations in the acceleration demanded torque calculation means 204 in a fourth embodiment.

In the above first to third embodiments, when an upper torque increase limit per unit time is set in the dynamic limit processing, the difference between the previous value of the demanded torque and the balance torque is used as an index. However, time elapsed from the start of the acceleration may be used as another index. FIG. 15 shows the acceleration demanded torque calculation means 204, to which this logic is applied, in the fourth embodiment in detail. As described above, the acceleration low-response demanded torque calculation means 301 and the acceleration high-response demanded torque calculation means 302 are each provided with a timer, and time elapsed from the start of the acceleration is used as an index during the dynamic limit processing. Specifically, a logic is applied, by which the upper torque increase limit is set to a slightly large value at the initial period of the acceleration, set to a small value in a period in which the engine-generated torque approaches near the balance torque in the mid-term of the acceleration, and then set again to a large value in the last term of the acceleration.

Figure 16:
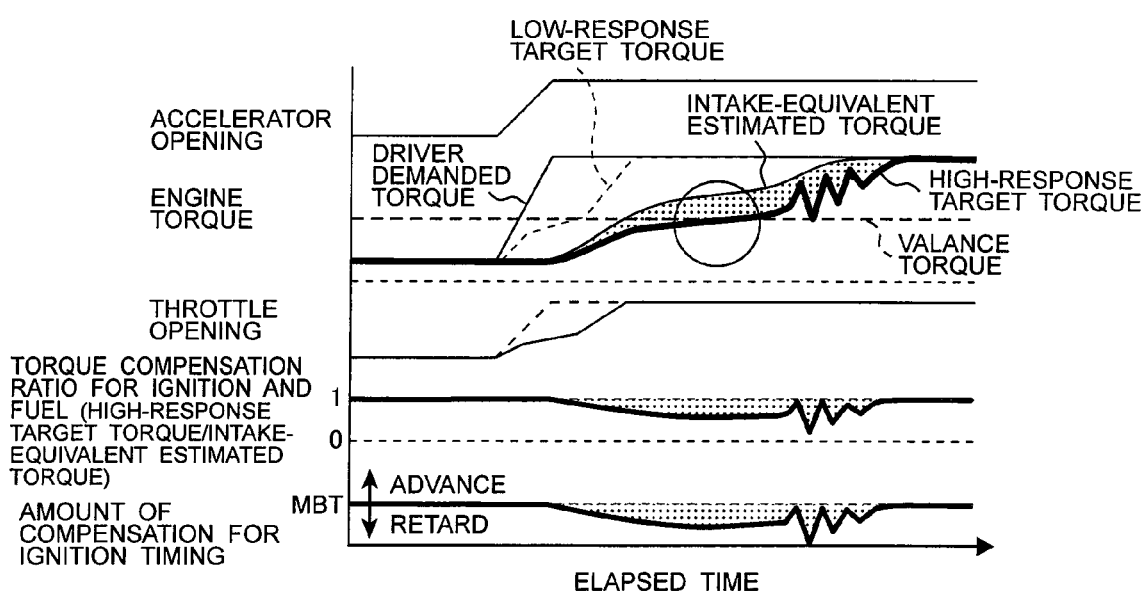
FIG. 16 illustrates how calculation parameters in the fourth embodiment change during acceleration.

If the upper torque increase limit is set to a too small value in the above first to third embodiments, the target torque trace stays near the balance torque for a long period of time, imposing a restriction on the setting of an upper torque increase limit. In this embodiment, since a desired upper torque increase limit can be set depending on the elapsed time, it is also possible to hold the target torque trace at the balance torque for a fixed time, for example, as shown in FIG. 16. In this embodiment, however, the start of acceleration needs to be determined more accurately, so exception processing further needs to be provided in case that the acceleration is cancelled in the middle.

Figure 17:
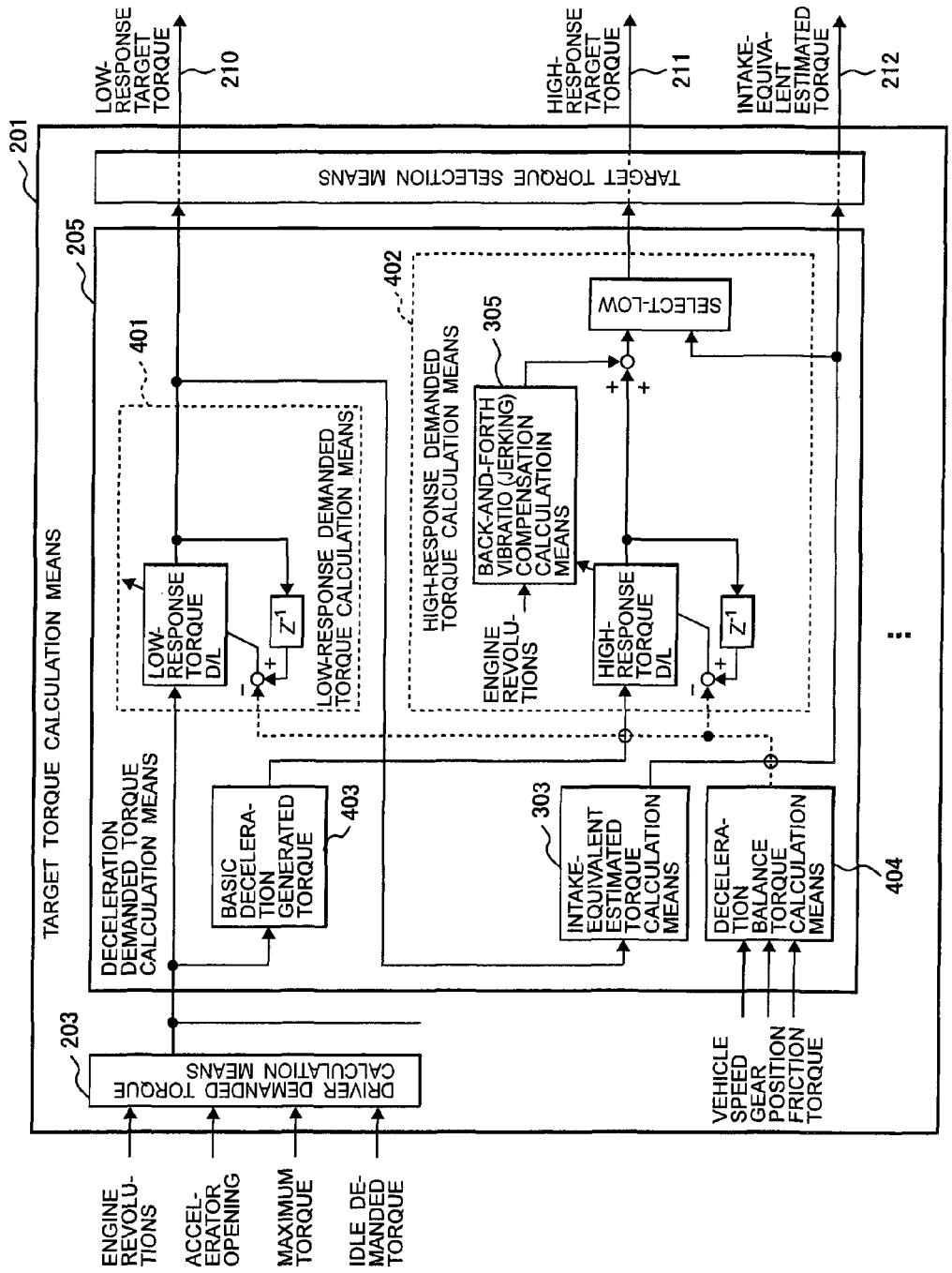
FIG. 17 shows calculations in the deceleration demanded torque calculation means 205 in a fifth embodiment.

This vehicle's back-and-forth vibration suppression logic can be applied to not only acceleration but also deceleration. The deceleration demanded torque calculation means 205 structured on the basis of the third embodiment is described below in detail as a fifth embodiment. FIG. 17 shows the parameter calculations in the deceleration demanded torque calculation means 205 in detail when deceleration is determined by the running state determination means 208 and the deceleration demanded torque calculation means 205 is selected. As in acceleration, the driver demanded torque is calculated in the driver demanded torque calculation means 203 as a first deceleration demanded torque calculation; the calculation is performed so that a torque property that is almost the same as in a mechanical throttle plus an ISC valve system is achieved.

As in acceleration, a deceleration balance torque calculation means 404 is provided in the deceleration demanded torque calculation means 205, which calculates an engine torque value necessary for keeping the engine upright with respect to the engine mount. The deceleration balance torque calculation means 404 accepts a vehicle speed, gear position, and friction torque and calculates the deceleration balance torque through a table search.

In the calculation of the deceleration low-response demanded torque, the dynamic limit processing is performed on the driver demanded torque to calculate the deceleration low-response demanded torque, as in acceleration. Specifically, the following calculations are performed.

(1) A difference in the torque between the deceleration low-response demanded torque value [previous value] and the balance torque is obtained, and an upper torque decrease limit corresponding to the difference in the torque is obtained from an upper torque decrease limit table.

(2) A decrease in the torque (=deceleration low-response demanded torque [previous value]−driver demanded torque) is obtained and the following calculation is performed.

a) When "decrease in the torque"<"upper torque decrease limit"

Deceleration low-response demanded torque value=driver demanded torque (current value)

b) When "decrease in the torque"≧"upper torque decrease limit"

Deceleration low-response demanded torque=deceleration low-response demanded torque [previous value]−upper torque decrease limit In view of the operational delay of the electronically controlled throttle valve and a delay in the charging or discharging of the intake due to an intake tube volume, the intake-equivalent estimated torque is calculated in the intake-equivalent estimated torque calculation means 303 by processing a delay on the low-response demanded torque, as in acceleration.

In the deceleration high-response demanded torque calculation, the dynamic limit processing is performed on the basic deceleration generated torque, which is calculated on the basis of the driver demanded torque, to calculate the basic deceleration high-response demanded torque, as in the calculation of the deceleration low-response demanded torque. The basic deceleration generated torque is a torque demanded on the assumption that this vehicle's vibration reducing logic is not used. It is yielded in a basic deceleration generated torque calculation means 403 by performing delay processing on the driver demanded torque. As in acceleration, after the jerking correction is performed on the basic deceleration high-response demanded torque value, select-low processing is finally performed on the basic deceleration high-response demanded torque value and the intake-equivalent estimated torque so as to calculate a final deceleration high-response demanded torque.

Next, how the parameters related to the deceleration demanded torque, calculated according to the calculation described above, change during deceleration will be described with reference to FIG. 18. Deceleration starts when the driver operates the accelerator. As the accelerator opening decreases, the driver demanded torque decreases. As for the low-response demanded torque, the decrease ratio is alleviated near the balance torque as a result of the dynamic limit processing. In conjunction with this, the decrease ratios of the throttle opening and the intake-equivalent engine torque are also alleviated.

Figure 18:
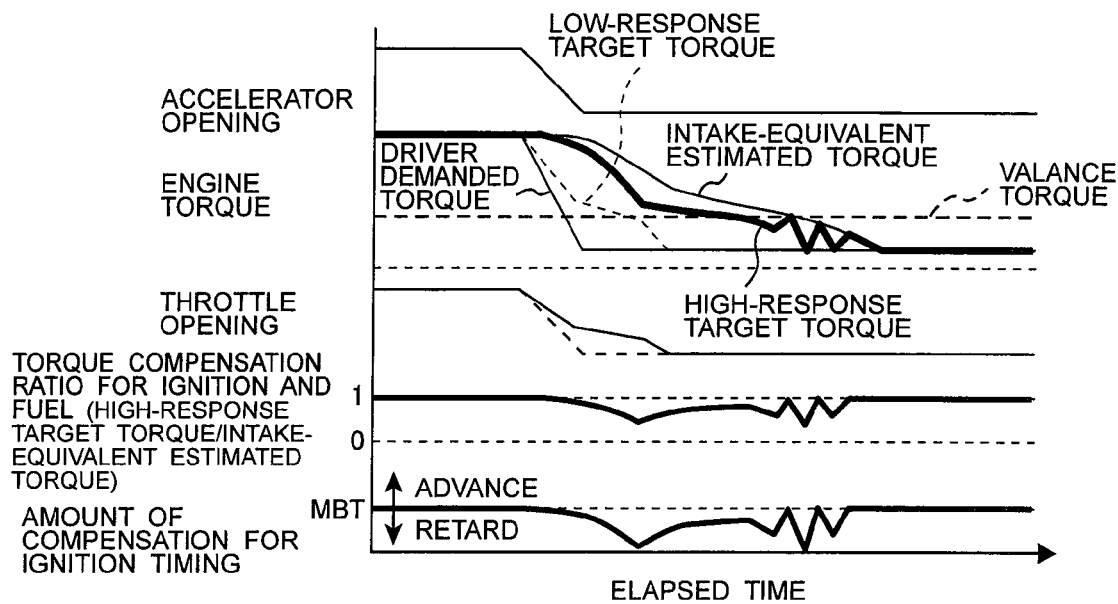
FIG. 18 illustrates how calculation parameters in the fifth embodiment change in deceleration.
Figure 19:
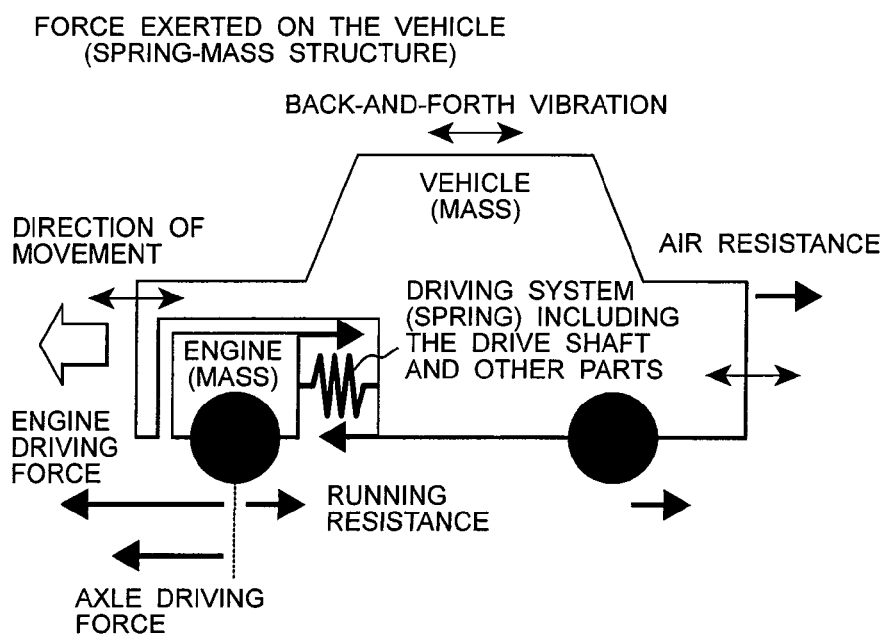
FIG. 19 shows a spring-mass structure of a vehicle.
Figure 20:
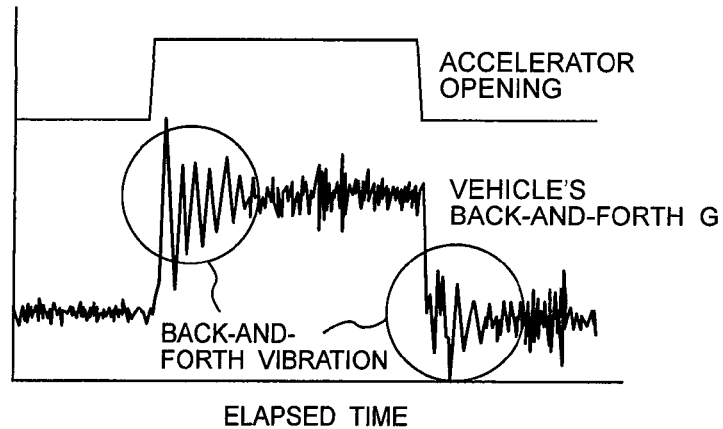
FIG. 20 illustrates vehicle's back-and-forth vibration caused when a vehicle is rapidly accelerated and decelerated.
Figure 21:
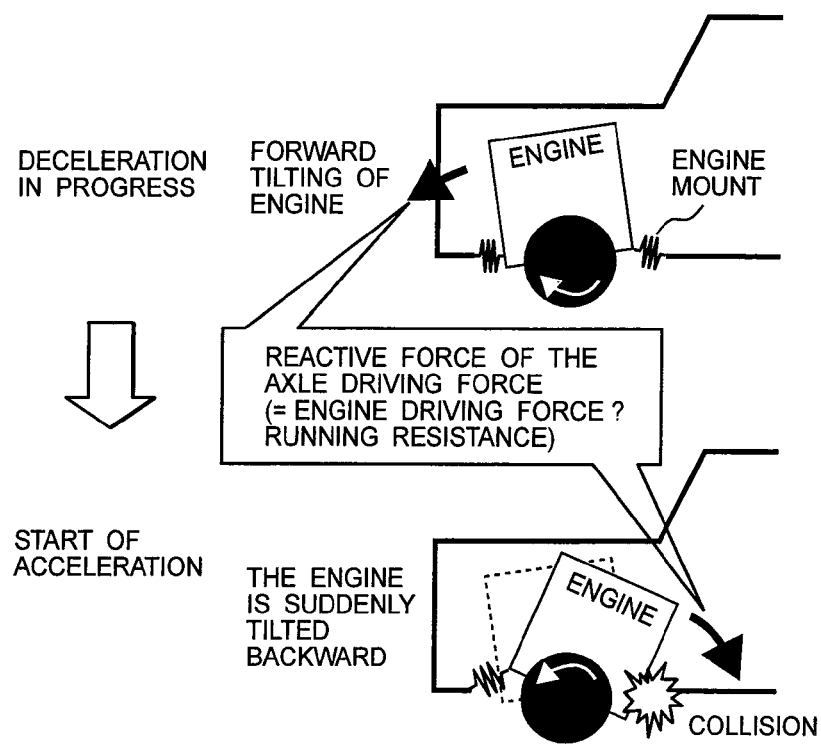
FIG. 21 illustrates how the engine swings when deceleration changes to acceleration.
Figure 22:
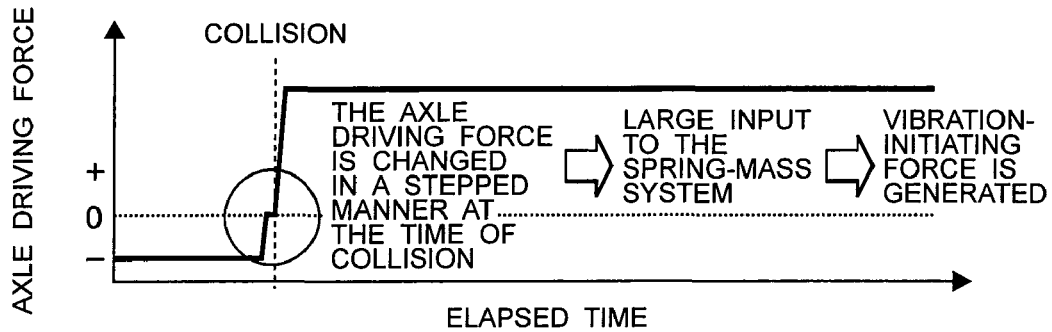
FIG. 22 illustrates how the driving force of the axle changes when deceleration changes to acceleration.
Figure 23:
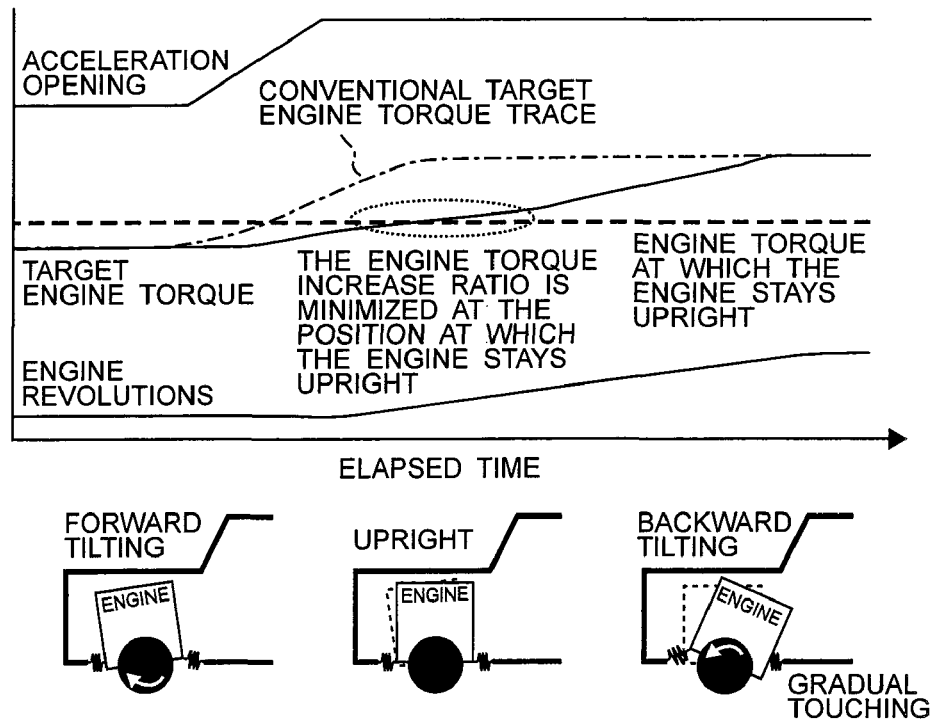
FIG. 23 shows, in the present invention, the relation between the target engine torque trace and the engine position.
Figure 24:
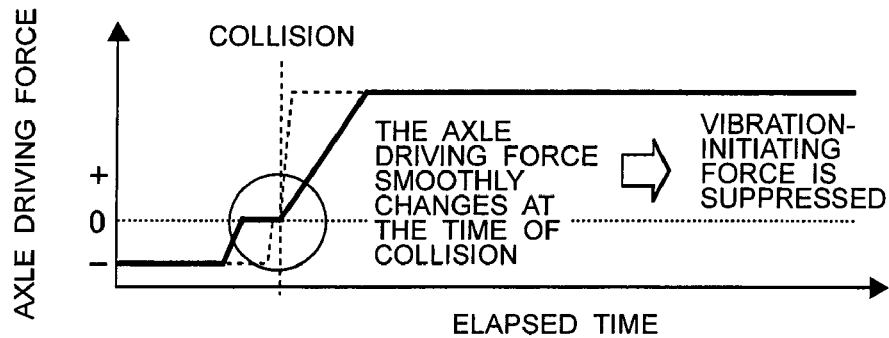
FIG. 24 illustrates, in the present invention, how the driving force of the axle changes when deceleration changes to acceleration.
Figure 25:
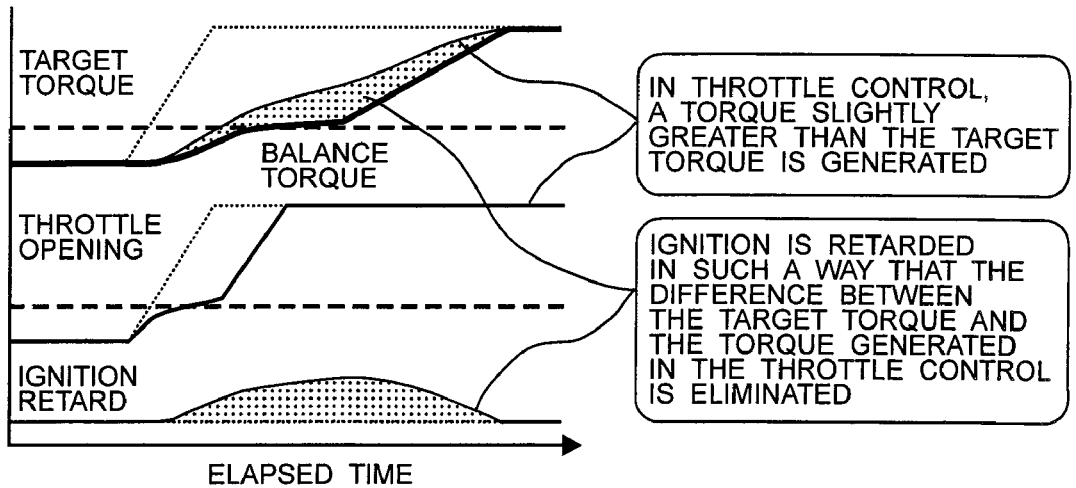
FIG. 25 illustrates how the target torque trace is achieved in the present invention.

To satisfy both the prevention of the vehicle's back-and-forth vibration and preferable accelerator response during deceleration, a high-response target torque trace as shown in FIG. 18 is calculated by the dynamic limit processing. That is, the high-response target torque gradually increases at the initial period of the deceleration; when the high-response target torque approaches the balance torque under this situation in the middle of deceleration, the lower torque decrease limit is set to an extremely small value by the calculation processing and the decrease ratio of the high-response target torque is lowered. After the high-response target torque then slowly passes near the balance torque, the lower torque decrease limit is alleviated again, and the high-response target torque has an appropriate torque decrease ratio. After the vehicle's back-and-forth vibration correction is performed in the middle, the high-response target torque finally reaches the driver demanded torque value.

During deceleration, the high-response target torque also often draws a geometrical target torque trace as shown in FIG. 18, as in acceleration, so it is hard to obtain the geometrical target torque trace in torque control only by the electronically controlled throttle valve. Accordingly, as in acceleration, the intake-equivalent engine torque, which can be predicted to be attainable in torque control only by the electronically controlled throttle valve, is estimated by the intake-equivalent estimated torque calculation means 303; if there is a difference between the estimated torque and the high-response target torque, a high-response torque operation is performed by retarding ignition so that the difference is eliminated.

The target torque calculation means and the target torque achieving means as described above control the torque so that the swinging of the engine during deceleration is moderated and the shock at the time of fixing the engine is reduced, and set the torque increase ratio immediately after the engine is fixed to an appropriate value to prevent a rapid rise from occurring in the torque applied to the driving system. As a result, both the prevention of the vehicle's back-and-forth vibration and preferable accelerator response can be achieved during deceleration.

In the above embodiment, a balance torque determination means is used to obtain an engine torque at which the engine stays upright. In a constant running state in which the vehicle is neither accelerated nor decelerated, however, the engine is maintained approximately upright. Accordingly, the torque generated by the engine when the vehicle is running in the constant running state without being accelerated or decelerated is determined by the torque determination means according to the opening of the accelerator and other factors. The torque determination means can use calculation by the target torque calculation means 201. When the acceleration/deceleration state determination means detects or estimates, from the vehicle speed, the opening of the accelerator, and the like, an acceleration/deceleration state in which the vehicle is decelerated from the constant running state and then accelerated or the vehicle is accelerated from the constant running state and then decelerated, the engine-generated torque is controlled so as to be maintained for a preset time at the torque in the constant running state when the engine-generated torque approaches the torque in the constant running state, which is calculated by the torque determination means, after which the engine-generated torque is controlled so that the acceleration/deceleration state is brought again. Accordingly, the engine, which would otherwise rapidly shift from the forward tilting state or backward tilting state to the upright state, becomes stationary or approximately stationary in the upright state, after which the engine shifts to the forward tilting state or backward tilting state. The engine does not rapidly enter the fixed state, so it prevents the vehicle's back-and-forth vibration and gives a preferable feeling of acceleration and deceleration.

What is claimed is:

1. A controller for an engine mounted in a vehicle, the controller comprising:

the engine which sways forward and backward in connection with the acceleration and deceleration of the above-mentioned vehicle, a balance torque calculation means for obtaining a balance torque, which is an engine torque at which the engine, which is swinging forward and backward following on the acceleration and deceleration of the vehicle, stays in a predetermined upright state, and a running state determination means for determining a running state based at least partly on any one of an accelerator opening, a vehicle speed, or an externally demanded torque, wherein when the torque generated by the engine passes the balance torque obtained by the balance torque calculation means during the acceleration or deceleration of the vehicle, the engine undergoes torque control according to a determination by the running state determination means so that the amount of change in the torque generated by the engine per unit time is restricted to small value compared with before and after passing the balance torque.

2. The controller for an engine according to claim 1, wherein the balance torque calculation means calculates the balance torque based on a vehicle speed and a gear position.

3. The controller for an engine according to claim 1, wherein an upper torque increase limit for restricting the amount of change in the torque is determined according to a difference between the torque generated by the engine and the balance torque.

4. The controller for an engine according to claim 1, wherein an upper torque increase limit for restricting the amount of change in the torque is determined according to a time elapsed from the start of the acceleration or deceleration.

5. The controller for an engine according to claim 1, wherein an upper torque increase limit for restricting the amount of change in the torque is capable of being changed depending on whether a history before the acceleration is "fuel cutoff in progress".

6. The controller for an engine according to claim 1, wherein an upper torque increase limit for restricting the amount of change in the torque is 10 Nm/10 ms or less.

7. The controller for an engine according to claim 1, wherein the torque is controlled by using any one of torque control means for an electronically controlled throttle, a variable valve, an ignition timing, and the amount of fuel to be injected or using a combination of these means.

8. The controller for an engine according to claim 1, further comprising a back-and-forth vibration suppression compensation calculation means that reduces a target torque when the engine revolutions are raised rapidly and increases the target torque when the engine revolutions drop rapidly so as to compensate vehicle's back-and-forth vibration.

* * * * *